Figures 1, 2:
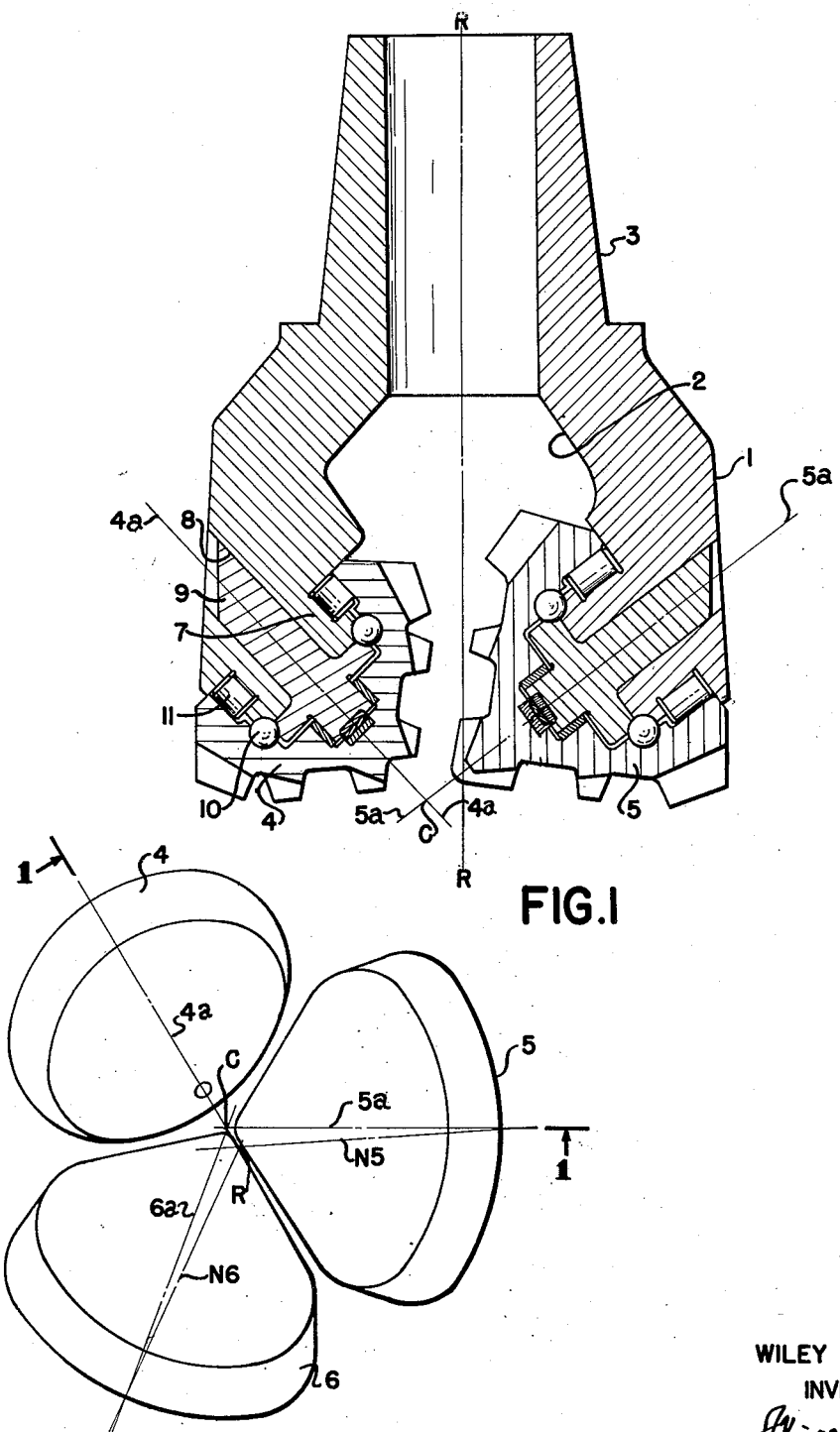

Oct. 16, 1951  W. B. NOBLE  2,571,930

DRILL BIT

Filed Oct. 11, 1946

WILEY B. NOBLE
INVENTOR

BY
ATTORNEYS

Patented Oct. 16, 1951

2,571,930

UNITED STATES PATENT OFFICE 2,571,930

DRILL BIT

Wiley B. Noble, Houston, Tex., assignor to Reed Roller Bit Company, Houston, Tex., a corporation of Texas Application October 11, 1946, Serial No. 702,712

3 Claims. (Cl. 255—71)

This invention relates to drill bits and will be found particularly useful in deep well drilling cone bits.

A conventional type of drill bit includes a head having a recess in its bottom and three conical roller cutters mounted on axes extending downwardly and inwardly in the recess. It is desirable that the bearings on which the cutters rotate be made as large as possible in order that they will have the strength to withstand the strains, stresses and shocks to which they are subjected in deep well drilling. It is also desirable to have deep cutting teeth on the exterior of the conical cutters for efficient performance in certain formations. The limited space available in the recess of the head renders exceedingly difficult the provision of a large bearing and deep teeth.

This invention has for one of its general objects the provision of a cone bit in which two of the cutters may be made sufficiently large to permit the use of a large bearing and deep teeth, and a third cutter is employed to balance the bit in operation.

Another object of the invention is to provide in a bit of this type cone cutters that do not have a true conical rolling action when the bit is rotated but instead are so mounted as to cause a dragging and scraping action of the teeth thereof, to efficiently penetrate the formation.

Other objects will hereinafter appear.

The preferred embodiment of the invention is illustrated by the accompanying drawings in which Fig. 1 is a sectional elevation taken on the line 1—1 of Fig. 2; and Fig. 2 is a diagrammatic bottom plan view illustrating the relative positions of the cutters.

In the drawings the bit head is indicated at 1 and the cutter recess at 2. The bit head is provided with the usual shank 3 for attachment to the lower end of a conventional drill stem (not shown).

Mounted for rotation in the recess 2 are one small cutter 4 and two large cutters 5 and 6. The cutters are so mounted that they rotate on axes extending downwardly and inwardly in the cutter recess. Any suitable mounting may be employed. Thus, the head may be provided with an annular flange 7 and a hole 8. A pin 9 may be inserted in the cutter 4, the balls 10 inserted in their raceways in the cutter, the rollers 11 in their raceways on the flange 7, and the pin 9 may then be slipped into the hole 8 and welded in place. The large cutters 5 and 6 may be similarly mounted as illustrated in Fig. 1.

Now it will be observed that the large cutters 5 and 6 extend inwardly from the periphery of the head to a point beyond the axis of rotation R of the head, and that the small cutter 4 is relatively remote from the axis of rotation R of the head. The axis of rotation of the cutter 4 is indicated by the line 4a; the axis of rotation of the cutter 5 is indicated by the line 5a and the axis of rotation of the cutter 6 is indicated by the line 6a. The axes of rotation 5a and 6a of the large cutters 5 and 6 do not intersect the axis of rotation R of the head. In the preferred embodiment, these axes of rotation 5a and 6a extend inwardly to intersect each other and the axis of rotation 4a of small cutter 4 at a point between the small cutter 4 and the axis R of the head. This point of intersection is indicated at C in Figs. 1 and 2. Since the axes of rotation 5a and 6a do not intersect the axis of rotation R of the head, the large cutters 5 and 6 will not have a true conical rolling action as they would have if they were mounted on axes of rotation intersecting the axis of rotation R of the head indicated by the lines N5 and N6 in Fig. 2. Since the axes of rotation of the cutters 5 and 6 are the axes of rotation 5a and 6a and not the conventional axes of rotation indicated by the lines N5 and N6, and the cutters 5 and 6 therefore do not have a true conical rolling action, this causes a dragging and scraping action of the teeth to efficiently penetrate the formation, and it also permits the cutters 5 and 6 to be made larger for the purpose above referred to.

The cutters need not be constructed, nor their axes of rotation located precisely as herein set forth but it is, of course, required that the intersection of the axes of rotation of the large cutters with the axis of rotation of the small cutter be offset from the axis of rotation of the bit head. Various changes will occur to those skilled in the art within the scope of the following claims.

I claim:

1. A three cone rotary bit comprising, a head having a trio of cone cutters rotatably mounted thereon upon downwardly and inwardly inclined supports, two of said cutters being relatively larger than the third relatively smaller cutter, the axis of rotation of the smaller cutter lying in a vertical plane which is radial to the bit head and the axes of rotation of the relatively larger cutters lying in vertical planes which are nonradial to the bit head, the axes of the three cutters intersecting at a common point between the outer end of the smaller cutter and the axis of rotation of the bit head, said relatively larger cutters extending on both sides of a common plane which is axial to the bit head with the apices of said larger cutters being positioned on the same side of said axial plane as the smaller cutter.

2. A three cone rotary bit as set forth in claim 1, wherein each relatively larger cutter is offset from its vertical non-radial plane in a direction opposite to the direction of offset of the other relatively larger cutter from its non-radial plane.

3. A three cone rotary bit as set forth in claim 1, wherein the common point of intersection between the axes of rotation of the three cutters is in a horizontal plane below the apex of the smaller cutter.

WILEY B. NOBLE.

REFERENCES CITED

The following references are of record in the file of this patent:

UNITED STATES PATENTS

| Number | Name | Date |
|---|---|---|
| 2,057,026 | Harrington | Oct. 13, 1936 |
| 2,104,820 | Scott | Jan. 11, 1938 |
| 2,147,926 | Scott | Feb. 21, 1939 |
| 2,148,372 | Garfield | Feb. 21, 1939 |
| 2,367,637 | Zublin | Jan. 16, 1945 |
| 2,463,932 | Zublin | Mar. 8, 1949 |